(12) United States Patent
Dicke

(10) Patent No.: US 12,267,475 B2
(45) Date of Patent: Apr. 1, 2025

(54) METHOD FOR ADOPTING ANALOGUE TEMPLATES IN DECOR PRINTING

(71) Applicant: Flooring Technologies Ltd., Kalkara (MT)

(72) Inventor: Sebastian Dicke, Bantikow (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 18/530,854

(22) Filed: Dec. 6, 2023

(65) Prior Publication Data

US 2024/0129424 A1 Apr. 18, 2024

Related U.S. Application Data

(63) Continuation of application No. 17/800,953, filed as application No. PCT/EP2021/054340 on Feb. 22, 2021, now Pat. No. 11,876,946.

(30) Foreign Application Priority Data

Feb. 20, 2020 (EP) ..................................... 20158525

(51) Int. Cl.
*H04N 1/60* (2006.01)

(52) U.S. Cl.
CPC ........... *H04N 1/603* (2013.01); *H04N 1/6097* (2013.01)

(58) Field of Classification Search
CPC .... H04N 1/603; H04N 1/6097; B41F 33/0036
See application file for complete search history.

(56) References Cited

U.S. PATENT DOCUMENTS

| 2002/0114533 | A1* | 8/2002 | Smith | G06T 5/10 382/167 |
| 2012/0105860 | A1* | 5/2012 | Jaschul | G01J 3/0254 356/456 |
| 2017/0259581 | A1* | 9/2017 | Pfeiffer | G06K 15/027 |
| 2018/0308260 | A1* | 10/2018 | Robles-Kelly | G01J 3/28 |
| 2021/0245493 | A1 | 8/2021 | Lehnhoff | |
| 2023/0081185 | A1* | 3/2023 | Dicke | B41F 33/0036 |

FOREIGN PATENT DOCUMENTS

| DE | 102009019545 A1 | 11/2010 | |
| DE | 102010007125 A1 * | 8/2011 | ............. G06F 17/50 |
| DE | 102015106770 B3 * | 8/2016 | |
| DE | 102017202031 A1 | 9/2017 | |
| EP | 3020565 A1 * | 5/2016 | ............. B41M 1/10 |

(Continued)

*Primary Examiner* — Ted W Barnes
(74) *Attorney, Agent, or Firm* — The Webb Law Firm

(57) ABSTRACT

The invention provides a method and an apparatus for adopting analogue decor templates in decor printing, including the similarity comparison between at least one of 1 to n hyperspectral digital reference images of the analogue decor template and at least one of 1 to n hyperspectral digital actual images of a substrate with decor. A decor-specific profile target is adjusted such that the digital template of the analogue decor template can be output on a substrate by way of an output medium in such a way that the colour deviation between at least one of 1 to n reference images of the analogue decor template and at least one of 1 to n actual images of the substrate with decor is below a specified target value.

13 Claims, 1 Drawing Sheet

(56) References Cited

FOREIGN PATENT DOCUMENTS

| EP | 3020565 | B1 | | 11/2016 | |
|----|---------|----|----|---------|----|
| EP | 3578939 | A1 | | 12/2019 | |
| WO | WO-2010003607 | A1 | * | 1/2010 | ....... G05B 19/41875 |
| WO | WO-2010124866 | A1 | * | 11/2010 | ................ G01J 1/04 |
| WO | WO-2019234147 | A1 | * | 12/2019 | .............. B41F 23/08 |

* cited by examiner

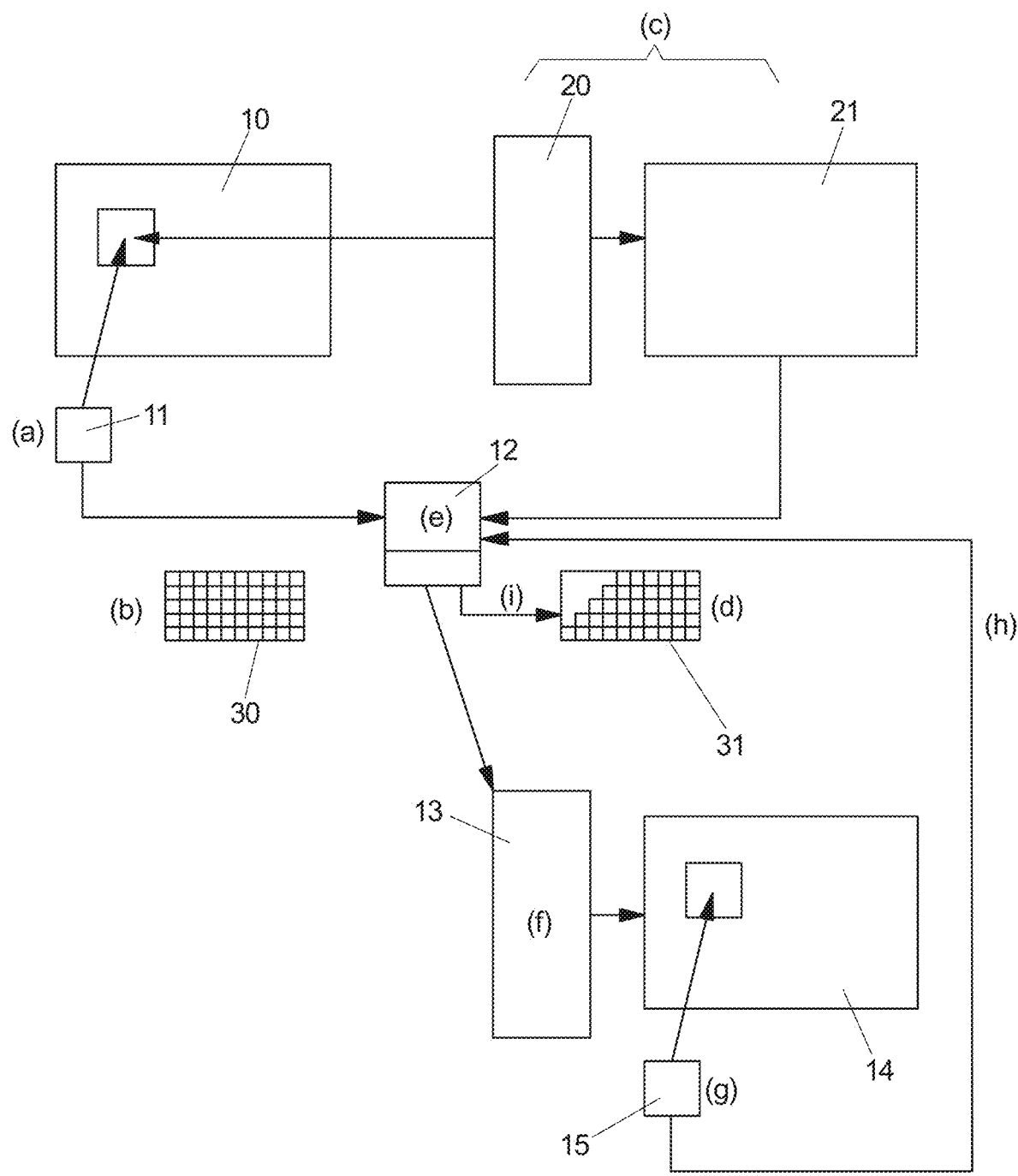

METHOD FOR ADOPTING ANALOGUE TEMPLATES IN DECOR PRINTING

CROSS-REFERENCE TO RELATED APPLICATIONS

This application is a continuation of U.S. patent application Ser. No. 17/800,953, filed Feb. 22, 2021, which is the United States national phase of International Application No. PCT/EP2021/054340 filed Feb. 22, 2021, and claims priority to European Patent Application No. 20158525.4 filed Feb. 20, 2020, the disclosures of which are hereby incorporated by reference in their entireties.

BACKGROUND OF THE INVENTION

Field of the Invention

The invention provides a method and an apparatus for transferring analog decor templates into decor printing, comprising comparison of similarity between at least one of 1 to n hyperspectral reference images of the analog decor template and at least one of 1 to n hyperspectral actual digital images of a decorated carrier material, wherein a decor-specific profile target is adjusted such that the digital template of the analog decor template can be output onto a carrier material by an output medium in such a way that the color variance between at least one of 1 to n reference images of the analog decor template and at least one of 1 to n actual images of the decorated carrier material is below a defined target.

Description of Related Art

Color is an essential feature of a printed decor which is produced by various techniques, for example intaglio printing or digital printing. In each of these techniques, the desired appearance of the print is achieved by layering of various pigment layers of the base colors. The intaglio printing method is a printing technique in which the elements to be imaged take the form of depressions in a printing block, for example of a print roll, that are inked prior to printing. The printing ink is present primarily in the depressions and is transferred to the article to be printed on account of contact pressure of the printing block and adhesion forces. In digital printing, by contrast, the printed image is transferred directly by a computer to a digital printer, for example a laser printer or inkjet printer, without the need to use static printing blocks. In digital printing, it is customary to use the base colors cyan, magenta, yellow and black (CMYK). The CMYK color model is a subtractive color model, where the abbreviation CMYK stands for the three color constituents cyan, magenta and yellow and the black component "key" as color depth.

With this color system, it is possible to depict a color space (gamut) that meets the requirements from a wide variety of different fields.

Printed decors find use, for example, in the production of small laminate or in the form of wall and roof covering elements. There are multiple approaches for decoration of the woodbase panels. For instance, it used to be the case that the coating of woodbase panels with a decorative paper was frequently utilized, with no limits on the variety of differently patterned decorative papers. As an alternative to the use of decorative papers on woodbase panels, the option of direct printing of woodbase panels has been developed, with no need for printing of paper and the subsequent lamination or direct coating thereof onto the woodbase panels. The main printing techniques used here are the intaglio printing and digital printing methods that have already been mentioned. For use of these printing methods, the printed decor exists as a digital template that depicts the colors and color distribution of the printed decor.

A major challenge here is the digital imaging and subsequent true-color printing of analog decor templates. In the provision of digital data for the production of decorative surfaces for different products such as furniture, floors, panels, wall coverings, facades and other everyday articles, templates or motifs from a wide variety of origins are first provided. According to the requirements, these may come from different sources. For instance, natural products such as wood or stone may be used on the one hand, or other templates that have been produced by further printing techniques such as intaglio printing or screen printing, or even by means of manual production, may be used on the other hand. These templates are subsequently digitalized using a scanner, for which the scanners use nowadays are capable of digitalizing large-format templates in one scan. Particularly those analog decor templates that comprise decors that frequently occur in nature are very popular with customers. True-color reproduction of the decors is therefore of great economic interest.

In the digitalizing of the analog template, in conventional methods, a digital image of the analog decor template is created, which can then be utilized for the industrial printing process. A digital image consists here, inter alia, of a multitude of pixels that are stored in an image file. The pixels each have a color value for a color system defined for the printed image. The representation of the color value of each individual pixel, as perceived by a human, results in a corresponding image assembled from the individual pixels. Frequently used color systems are, for example, CMYK, RGB, or else specific color systems such as sRGB or ISOcoatedv2_CMYK. The individual color systems here span a color space that represents the possible colors present in the digital image.

The problem here is that the digitalizing gives rise to a device-specific digital image of the analog decor template, the color values of which depend on the color system that forms the basis of the digitalization, and hence is frequently not a true-color image of the analog decor template. Secondly, the color system on which the visualization is based frequently differs from the color system which is used in the printing of the decor.

A problem that has not been solved satisfactorily to date and is a central topic in all areas of the color-based or color-processing industry is the attainment of a high level of trueness to color, in other words the ability to reproduce defined colors with minimal chromatic difference in relation to an original. An essential step for solving this problem the analysis of the color composition of a defined original.

DE 10 2017 007 125 A1 relates to a method of providing and using decor data. The decor data are obtained here by the scanning of patterns of existing decor, laminates and/or real materials. The core of the method is decor data management using a central decor database. The method does not involve true-color reproduction of the real existing patterns that were digitalized in the method by a printing process.

DE 10 2017 202 031 A1 is concerned with the correction of color variances in digital printing machines. The aim of the method is to enable true-color reproduction of a digital print template in the printing process. It is not possible to digitalize and subsequently print a real existing decor template by the method described.

EP 3 020 565 B1 is concerned with a method of producing true-color and -detail reproductions of a printed decor by various printing techniques. The method provides for generation of decor prints on carrier materials with a more comparable impression of quality, regardless of whether the decor has been printed by digital or analog means. No comparison with an analog, i.e. real existing, decor template is envisaged in the method. The method does not involve true-color reproduction of an analog decor template.

It is therefore an object of the present invention to provide a method by which analog decor templates can be transferred in a true-color manner into decor printing, especially into digital decor printing.

SUMMARY OF THE INVENTION

The object is achieved by the present invention by a method as described herein and an apparatus as described herein.

In particular, the invention provides a method of transferring analog decor templates (10) into decor printing, comprising comparison of similarity between at least one of 1 to n hyperspectral reference images of an analog decor template and at least one of 1 to n hyperspectral actual digital images of a decorated carrier material (14), where preferably n∈N, characterized in that the method comprises the following steps:
a) producing and storing 1 to n hyperspectral digital reference images of the analog decor template;
b) creating a decor-specific reference target (30) from the 1 to n hyperspectral digital reference images, wherein the creating of a decor-specific reference target (30) from the 1 to n hyperspectral digital reference images comprises the compounding of the individual hyperspectral digital reference images by means of graphics software when n>1;
c) creating a decor-specific profile target (31) from a digital template of the analog decor template (21) using one or more sections of the digital template of the analog decor template (21) that depict an identical section or identical sections of the decor to the 1 to n digital hyperspectral reference images;
d) computing a corrected decor-specific profile target from the decor-specific reference target (30) and the decor-specific profile target (31);
e) outputting the digital template of the analog decor template (21) onto a carrier material by means of an output device (13) taking account of the corrected decor-specific profile target;
f) producing 1 to n hyperspectral actual digital images of the decorated carrier material (14), wherein the 1 to n hyperspectral actual digital images are recorded in the same sections of the decor as the 1 to n hyperspectral digital reference images;
g) ascertaining the similarity index between at least one of the 1 to n hyperspectral digital images of the decorated carrier material (14) and at least one of the 1 to n hyperspectral digital reference images; and
h) adjusting and storing the corrected decor-specific profile target taking account of the color variances ascertained when the similarity index is below a defined target value, outputting the digital template of the analog decor template (21) onto a carrier material by means of an output device (13) taking account of the adjusted corrected decor-specific profile target, and repeating steps f) to g);

wherein adjusting of the corrected decor-specific profile target in method step h) is conducted until the similarity index between at least one of the 1 to n hyperspectral actual digital images and at least one of the 1 to n hyperspectral digital reference images is above a defined target value.

A hyperspectral digital image can be generated by means of a hyperspectral system, for example with a hyperspectral camera more preferably by means of a hyperspectral scanner. What is meant here by "hyperspectral" is that an image of very many wavelengths close to one another is recorded. The eye sees the environment in a multispectral manner in the wavelengths of the base colors red, green and blue. Hyperspectral systems, by contrast, show data from 20 to 250 channels that range from wavelengths in the ultraviolet region to the longwave infrared. The hyperspectral image thus contains more color information than is perceived by the human eye from the same image. This is utilized in accordance with the invention in order to enable a decor print of an analog print template which is perceived by the human eye to be a true-color decor print. A hyperspectral digital image therefore refers in accordance with the invention to a digital image in which data from 20 to 250 channels that range from wavelengths in the ultraviolet region to the longwave infrared are depicted.

The prior art includes a corresponding method of generating hyperspectral images in the form of ACMS® (Advanced Color Management System). Hyperspectral systems have a multitude of detectors. The result of the recording is a hyperspectral data cube with two spatial dimensions and one spectral dimension. Or basic techniques are available for generation of this hyperspectral data cube. A "snapshot" provides the entire dataset with a single detector output. In the course of spatial scanning, each detector output provides the spectrum of a narrow strip of the template. In the course of spectral scanning, each detector output provides a monochromatic spatial map of the template. In the course of spatial-spectral scanning, each detector output provides a spectrally coded spatial map of the template.

What is also advantageous about the use of a hyperspectral image according to the present invention is that these images can be recorded at high speed. This increases efficiency in the production process and hence economic viability of the method of the invention.

In step a) of the method of the invention, the analog decor template records 1 to n hyperspectral digital images, where preferably n∈N. n here is from 1 to 100, preferably from 1 to 50, more preferably from 1 to 10. In the case of wood decors, for example, n is preferably from 1 to 3.

The 1 to n hyperspectral digital images of the analog decor template serve as reference images for the analog decor template. In one embodiment of the invention, the 1 to n hyperspectral digital images are used to image the entire analog decor template. In a preferred embodiment of the invention, the 1 to n hyperspectral digital images of the analog decor template image 1 to n sections of the analog decor template that are particularly characteristic of the analog decor template. This means that sections that give a particularly good reproduction of the analog decor and the color configuration thereof are imaged.

In a preferred embodiment of the invention, the 1 to n hyperspectral digital reference images therefore image a section or sections of the analog decor template that are characteristic of the decor.

Analog decor templates according to the present invention are decor templates which, as already described at the outset, are in physical form. In principle, this means that all kinds of natural and printed templates are usable. Examples of such decor templates are wood grains of wood decors, natural stone decors, analog printed templates on paper, and mechanically printed templates on various materials.

In method step (b), according to the invention, a decor-specific reference target is created from the 1 to n hyperspectral digital reference images, wherein the creating of a decor-specific reference target from the 1 to n hyperspectral digital reference images comprises the compounding of the individual hyperspectral digital reference images by means of graphics software when n>1. Graphics software suitable for this task is known to the person skilled in the art.

The decor-specific reference target includes the decor-specific color values of the analog print template. In one embodiment of the invention, the color values are represented in standardized fields, with the entire field represented by a color value. Each color field is assigned a particular color value, and so such a color field can be unambiguously found in the profile target. Typical numbers of color fields and a reference target are known to the person skilled in the art. A decor-specific reference target may comprise, for example, between 300 and 5000 color fields, preferably between 300 and 3000 color fields, more preferably between 300 and 800 color fields. For the color values in the color fields, it is possible, for example, to use color systems such as CMYK or RGB, or else specific color systems such as sRGB or ISOcoatedv2_CMYK.

The decor-specific color values of the analog print template are ascertained depending on the frequency of the individual color values in the 1 to n hyperspectral reference images of the analog print template by means of a computation unit, and hence in an automated manner. In one embodiment of the invention, all color values that occur in the 1 to n reference images are represented as decor-specific color values in the decor-specific reference target. In a further embodiment of the invention, the color values that occur most frequently in the 1 to n reference images are imaged as decor-specific color values in the decor specific reference target. In this case, a sufficient number of color values is imaged until the maximum possible number of color values for the decor-specific reference target has been attained. The decor-specific reference target but includes the color values that are characteristic of the analog decor template.

In a preferred embodiment of the invention, the decor-specific reference target therefore includes the decor-specific color values of the analog decor template.

A digital template of the analog decor template is used in method step c) to create a decor-specific profile target using one or more sections of the digital template of the analog decor template that depict an identical section or identical sections of the decor to the 1 to n digital hyperspectral reference images.

According to the invention, firstly a decor-specific reference target is created from the 1 to n hyperspectral digital reference images, and secondly an independent decor-specific profile target from a digital template of the analog decor template. With the aid of the two independent targets, it is possible to determine color variances between analog template and digital template of the analog template. The method of the invention thus differs significantly from prior art methods. In EP 3 578 939 A1, for example, a digital target image is created on the basis of at least one calibrated hyperspectral image. The digital target image thus does not result from the at least one calibrated hyperspectral image and is not independent thereof. Thus, in EP 3 578 939 A1, there is no decor-specific profile target in the context of the present invention. Instead, calibration according to EP 3 578 939 A1 comprises the computation of an "average image", for example with average color values.

This is accomplished analogously to the creation of the decor-specific reference target depending on the frequency of the color values in the digital image of the digital template of the analog decor template. This means that, again, the most common color values are ascertained and these are represented as decor-specific color values of the digital template of the analog decor template in the decor-specific profile target. The decor-specific profile target therefore includes the color values that are characteristic of the digital template of the analog decor template. The creation of the decor-specific profile target is accomplished by means of a computation unit and is thus likewise automated. In a preferred embodiment of the invention, the decor-specific profile target includes the decor-specific color values of the digital template of the analog decor template.

If the 1 to n reference images, where preferably n∈N, do not depict the entire analog decor template but merely sections thereof, the same sections of the decor of the digital template of the analog decor template are preferably used for the creation of the decor-specific profile target. This means that the color values used for the creation of the decor-specific profile target are those that occur in the corresponding section(s) of the decor of the digital template of the analog print template. Depending on the frequency of the color values, these are the decor-specific color values that are represented in the decor-specific profile target. In one embodiment of the invention, all color values that occur in the section(s) of the digital template of the analog decor template are decor-specific color values that are represented in the decor-specific profile target. In a further embodiment of the invention, the color values that occur most frequently in the section(s) of the digital template of the analog decor template are imaged as decor-specific color values in the decor-specific profile target. In this case, a sufficient number of color values is imaged until the maximum possible number of color values for the decor-specific profile target has been attained.

In one embodiment of the invention, therefore, one or more sections of the digital template of the analog decor template that are used for the creation of the decor-specific profile target are those that have an identical section or identical sections to the 1 to n reference images.

Preferably, the decor-specific profile target has the same number of color fields as the decor-specific reference target.

In a further embodiment of the invention, the decor-specific profile target may alternatively have a smaller number of color fields compared to the decor-specific reference target.

In a further embodiment of the invention, not only are identical sections of the decor used for the creation of the decor-specific reference target and of the decor-specific profile target, but also the exact same positions within identical sections for the determination of the color values of the color fields. This is particularly advantageous when the analog template contains particular colors.

Preferably, both the decor-specific reference target and a decor-specific profile target are stored.

The digital template of the analog decor template may already be available in the form of a digital image. In one embodiment of the invention, a digital template of the analog decor template is produced by scanning or photographing the analog decor template. If the digital template of the analog print template is produced by photography, preference is given to using a digital camera.

In method step d), a corrected decor-specific profile target is computed from the decor-specific reference target and the decor-specific profile target. For this purpose, the color values of the color fields of the decor-specific reference target are compared to the color values of the color fields of the decor-specific reference target. If the color values of a color field of the decor-specific profile target are at variance from the assigned color value of the decor-specific reference target, these are corrected correspondingly. What is meant by "correction" in this connection is that the proportions of the individual constituents of the course utilized for the color values are modified.

In a preferred embodiment, the color values of the decor-specific profile target are corrected in such a way that the color values of the corrected decor-specific profile target correspond to the color values for the decor-specific reference target.

This operation is conducted by means of a computation unit and hence in a fully automated manner. Programs that undertake these types of correction are known to the person skilled in the art. The decor-specific profile target thus modified forms the corrected decor-specific profile target. The corrected decor-specific profile target is preferably stored after the computation.

In method step e), the digital template of the analog decor template is output by an output unit onto a carrier material taking account of the corrected decor-specific profile target. According to the invention, the output of the digital template of the analog decor template may be by means of digital printing. The digital printing may be executed directly or else indirectly. Particular preference is given to output by means of digital direct printing. Method step e) generates a decorated carrier material.

If not only identical sections of the decor have been used in the creation of the decor-specific reference target and the decor-specific profile target but also the exact same positions within identical sections have been used for the determination of the color values of the color fields, it is possible in the output of the analog decor template taking account of the corrected decor-specific profile target to assign the color values particularly exactly to the respective positions in the output of the digital template of the analog decor template onto the carrier material.

Suitable carrier materials are, for example, paper, glass, metal, foils, woodbase materials, especially MDF or HDF boards, WPC boards, veneers, paint layers, plastic sheets and inorganic carrier sheets. Preference is given in accordance with the invention to woodbase panels and paper.

In one embodiment of the invention, paper is used as carrier material. Paper suitable as print base paper is preferably white and has a weight of 60 to 90 $g/m^2$, preferably 65 to 80 $g/m^2$, more preferably 70 $g/m^2$. The paper is provided with a primer prior to printing in order to prime it. Suitable agents that can be used as primer are known to the person skilled in the art.

The digital printing for printing of at least one side, for example of a woodbase panel, may be performed using a digital printer with a water-based digital printing ink, or a UV or solvent-based ink. Preference is given to use of a water-based digital printing ink. The amount of digital printing ink used may be between 5 and 15 $g/m^2$, preferably 6 and 8 $g/m^2$.

In one embodiment of the invention, the digital template of the analog decor template is applied to a primed carrier material. Especially when woodbase panels are used, in one embodiment of the present process, at least one primer layer comprising at least one resin and/or at least one varnish is applied to the side of the woodbase panel to be printed prior to printing with the digital template of the analog decor template, and this is then dried and/or partly cured.

Preferably, the surface of the side of the woodbase panel to be printed is ground prior to the application of the primer.

Priming can be accomplished by applying an aqueous resin solution and/or a radiation-curable surfacer compound to the side of the carrier material to be printed. Usable primers are, for example, aqueous resin solutions such as melamine-formaldehyde resin, urea-formaldehyde resin or melamine-urea-formaldehyde resin. It is likewise possible to precoat or to prime the carrier material with 1K/2K acrylate, UV and/or EBC surfacers, and then to correspondingly cure said primer layer.

For the preliminary coating or priming of the woodbase panel, preference is given to using an aqueous resin solution which an aqueous resin solution, especially an aqueous solution of a melamine-formaldehyde resin, urea-formaldehyde resin or melamine-urea-formaldehyde resin.

The application rate of liquid resin solution for priming may be between 10 and 80 $g/m^2$, preferably 20 and 50 $g/m^2$. The solids content of the aqueous resin solution is between 30% and 80%, preferably 40% and 60%, especially preferably 55%. The liquid resin may additionally include suitable wetting agents, curing agents, separating agents and defoamers.

After application of the aqueous resin solution to the woodbase panel for precoating or priming thereof, the liquid resin is dried to a moisture content of 10%, preferably 6%, for example in a convection oven or near infrared oven.

In another embodiment of the present method, the woodbase material may be precoated or primed with 1K/2K acrylate and/or EBC surfacer. A UV surfacer compound advantageously consists essentially of UV-curable paint components, pigments, reactive diluents and free-radical initiators as chain initiator.

The application rate of the surfacer compound in this case may be 50 to 150 $g/m^2$, preferably 50 to 100 $g/m^2$. The figures given are based here on a 100% surfacer compound.

It is likewise possible that the surfacer compound used for priming is in pigmented form, by means of which the print outcome can be varied or improved.

Particular preference is given in accordance with the invention to the precoating of the woodbase panel with a transparent primer.

In a further embodiment of the present method, the printing of the at least one side of the woodbase panel is preceded by application of at least one layer of a pigmented primer, which is preferably water-based, to the side of the woodbase panel to be printed. The pigmented primer may be applied either directly to the untreated surface of the material panel or else to the previous, preferably transparent, primer.

The water-based pigmented primer may also be applied in more than one layer (for example 3 to 10 layers, preferably 5 to 8 layers, more preferably 7 layers), in which case each layer application is followed by drying of the pigmented primer, for example in a convection dryer or a near infrared dryer. The water-based pigmented primer preferably contains at least one light-colored pigment, more preferably at least one white pigment.

White pigments are achromatic inorganic pigments having a high refractive index (greater than 1.8) that are used in particular for creation of optical whiteness in paints or as filler in plastics for example. White pigments according to the invention may be selected from the group comprising titanium dioxide, lithopone, barium sulfate, zinc oxides, zinc sulfide and calcium sulfate. Lithopone is a white pigment comprising barium sulfate and zinc sulfide. According to the invention, preference is given to using titanium dioxide as white pigment in the water-based pigmented primer since titanium dioxide has the highest refractive index and hence the highest hiding power among the known white pigments.

In method step f), 1 to n hyperspectral actual digital images of the decorated carrier material are produced, with the 1 to n hyperspectral actual digital images depicting the same sections of the decor as the 1 to n hyperspectral digital reference images.

In a preferred embodiment, the 1 to n reference images and the 1 to n actual images according to method steps a) and f) are produced under the same conditions. This guarantees that altered ambient conditions do not have any effect on the images recorded and the color values thereof. The hyperspectral actual digital images are preferably recorded as described at the outset by means of a hyperspectral camera, more preferably by means of a hyperspectral scanner. In a particularly preferred embodiment of the invention, the 1 to n reference images are recorded by the same means of recording hyperspectral images, preferably a hyperspectral scanner.

As already mentioned, the 1 to n hyperspectral actual digital images are preferably recorded on a section or sections of the decor that are also imaged by the 1 to n hyperspectral digital reference images. It is likewise favorable here to record as many actual images as reference images have been created in method step a).

In method step g) according to the present invention, the similarity index between at least one of the 1 to n actual images of the decorated carrier material and at least one of the 1 to n reference images is ascertained. The ascertaining of the similarity index between the at least one of the 1 to n actual images and at least one of the 1 to n reference images is conducted by a similarity comparison. This similarity comparison always takes place between a pair of images. One pair of images is formed here by an actual image and a reference image that depict an identical section of the decor. Particular preference is therefore given to ascertaining the similarity index between an actual image and a reference image in each case that depict the same section of the decor.

In a preferred embodiment of the invention, the similarity index is ascertained between n actual images and n reference images, where n>1. Comparison of similarity of more than one pair of images increases the accuracy of the method of the invention.

The comparison of similarity is conducted by means of software on a computation unit. If the ACMS® method is used to generate the hyperspectral images in method steps a) and f), the comparison of similarity can advantageously be made using the similarity index of the associated software. This application is known to the person skilled in the art. This similarity index represents the color variance between the pair of images. The greater the similarity index, the smaller the variance in the color values in the images of the pair of images. Accordingly, the greater the similarity index, the greater the trueness of color in the reproduction of the analog decor template to give the digital template of the analog decor template when this is output on the output device used in method step e).

For the similarity index, a minimum target value is defined. The target value is fixed depending on the decor and the colors present therein. A customer demand for true-color reproduction of an analog decor can likewise be taken into account via the choice of target value. The target value is reported in % and is in the range from 75% to 100%, preferably in the range from 85% to 100%, more preferably in the range from 89% to 100%. The higher the target value chosen, the smaller the color variance is tolerated between the analog decor template and the decorated carrier material. This means that the higher the target value chosen, the greater the trueness of color in the reproduction of the analog decor in the digital print by means of the present invention. By means of the specification, it is possible to stipulate the trueness the color with which the analog decor template is to be output on a particular output device via the digital template of the analog decor template. This means the trueness to color of the decorated carrier material with respect to the analog decor template.

If the similarity index ascertained is below a defined target value, the corrected decor-specific profile target in method step h) is adjusted taking account of the color variance ascertained in the similarity comparison, and the adjusted corrected decor-specific profile target is stored.

The corrected decor-specific profile target can be adjusted with the aid of software customary in the art on a computation unit via the similarity index ascertained. The similarity index in this case is used to calculate a color profile which is used to adjust, i.e. alter, the color values in the corrected decor-specific profile target.

Subsequently, the digital template of the analog decor template is output through an output device taking account of the adjusted corrected decor-specific reference target.

Preference is given to using the same output device as in the prior method steps. Likewise preferably, the digital template of the analog decor template is also printed onto the same type of carrier material as in the preceding method steps. This is advisable in order to minimize the influence of output device and carrier material on the color values of the decor of the decorated carrier material. According to the invention, method steps f) to g) are subsequently repeated. This means that, again, 1 to n hyperspectral actual images of the decorated carrier material are recorded under the conditions already detailed. Subsequently, the similarity index is again ascertained between at least one of the 1 to n actual images of the decorated carrier material and at least one of the 1 to n reference images.

According to the invention, the adjustment of the corrected decor-specific profile target in method step h) is conducted until the similarity index between at least one of the 1 to n actual images and at least one of the 1 to n reference images is above a defined target value.

According to the invention, the similarity index at least between one actual image and one reference image is ascertained. It is alternatively possible to ascertain the similarity index for n actual images and n reference images, with n>1. In this case, n similarity indices are correspondingly ascertained. According to the invention, an adjustment of the corrected decor-specific profile target takes place as soon as one of n similarity indices ascertained is below a defined target value.

In a preferred embodiment of the invention, the corrected decor-specific profile target or the adjusted corrected profile target with which a decorated carrier material is produced in method step e) and which has a similarity index ascertained in method step g) between at least one of the 1 to n actual images of the decorated carrier material and at least one of the 1 to n reference images that is above a defined target value is stored as the digital original of the analog decor template.

This means that when the similarity index of a decorated carrier material and an analog decor template is above a defined target value, the corrected decor-specific profile target used for the generation of the decorated carrier material or the adjusted corrected decor-specific profile target used is stored as the original. For this purpose, the similarity index between at least one of the 1 to n actual images of the decorated carrier material and at least one of the 1 to n reference images which is ascertained in method step g) must be above a defined target value. In one embodiment of the invention, all similarity indices between the 1 to n actual images of the decorated carrier material and the 1 to n reference images that are ascertained in method step g) must be above a defined target value. The digital original can thus advantageously serve as template for the decor print, especially with the output device used in the method. It thus constitutes a digital print template for an analog decor template with which a true-color decor print of the analog decor template becomes possible.

In a preferred embodiment, the invention provides a method of transferring analog decor templates into decor printing, comprising comparison of similarity between at least one of 1 to n hyperspectral reference images of an analog decor template and at least one of 1 to n hyperspectral actual digital images of a decorated carrier material, where n is from 1 to 100, characterized in that the method comprises the following steps:
a) producing and storing 1 to n hyperspectral digital reference images of the analog decor template, wherein each hyperspectral digital reference image has a hyperspectral data cube with two spatial and one spectral dimension;
b) creating a decor-specific reference target from the 1 to n hyperspectral digital reference images, wherein the creating of a decor-specific reference target from the 1 to n hyperspectral digital reference images comprises the compounding of the individual hyperspectral digital reference images by means of graphics software when n>1;
c) creating a decor-specific profile target from a digital template of the analog decor template using one or more sections of the digital template of the analog decor template that depict an identical section or identical sections of the decor to the 1 to n digital hyperspectral reference images;
d) computing a corrected decor-specific profile target from the decor-specific reference target and the decor-specific profile target by comparing the color values of the color fields of the decor-specific profile target with the color values of the color fields of the decor-specific reference target and correcting the color values of the color fields of the decor-specific profile target that vary from the color value of the assigned color field of the decor-specific reference target;
e) outputting the digital template of the analog decor template onto a carrier material by means of an output device taking account of the corrected decor-specific profile target;
f) producing 1 to n hyperspectral actual digital images of the decorated carrier material, wherein the 1 to n hyperspectral actual digital images are recorded in the same sections of the decor as the 1 to n hyperspectral digital reference images;
g) ascertaining the color variances and the similarity index between at least one of the 1 to n hyperspectral digital images of the decorated carrier material and at least one of the 1 to n hyperspectral digital reference images that depict the same section of the decor; and
h) adjusting and storing the corrected decor-specific profile target taking account of the color variances ascertained when the similarity index is below a defined target value, outputting the digital template of the analog decor template onto a carrier material by means of an output device taking account of the adjusted corrected decor-specific profile target, and repeating steps g) to h);

wherein adjusting of the corrected decor-specific profile target in method step i) is conducted until the similarity index between at least one of the 1 to n hyperspectral actual digital images and at least one of the 1 to n hyperspectral digital reference images is above a defined target value.

It is particularly preferable when the method of the invention comprises, between step b) and step c), as an additional step, the creation of a digital template of the analog decor template by scanning or photographing the analog decor template.

For production purposes in which the original is used for decor printing, for example of woodbase panels, the woodbase panels are first primed, as described above. Thereafter, the original is printed onto woodbase panels on the production scale.

It is likewise possible to apply at least one protective layer to the printed decor(s), preferably two or three layers comprising abrasion-resistant particles, natural fibers, synthetic fibers and/or further additives, for which it is possible to use resins such as melamine-formaldehyde resin, urea-formaldehyde resin, acrylate resins and polyurethane resins as suitable binders.

The abrasion-resistant particles are preferably selected from the group comprising aluminas, corundum, boron carbide, silicon carbide and glass beads. Natural and/or synthetic fibers used especially fibers selected from the group comprising wood fibers, cellulose fibers, wood fibers, hemp fibers and organic or inorganic polymer fibers.

Additives added may be conductive substances, flame retardant, luminescent substances and metals. It is possible here for the conductive substances to be selected from the group comprising carbon black, carbon fibers, metal powders and nanoparticles, especially carbon nanotubes. It is also possible to use combinations of the substances. Flame retardants used are preferably phosphates, borates, especially ammonium polyphosphate, tris(tribromoneopentyl) phosphate, zinc borate or boric acid complexes of polyhydric alcohols. Luminescent substances used are preferably inorganic- or organic-based fluorescent and/or phosphorescent substances, especially zinc sulfide and alkali metal aluminates.

In a further embodiment of the present method, the printed carrier material that has optionally been provided with a protective layer, especially of formaldehyde resins, is processed further or finished in a short-cycle press. In the short-cycle press, the resin layers are melted and the layer composite is cured to form a laminate. During the further processing in the short-cycle press, it is also possible, using a structured press plate, to produce surface structures in the surface of the carrier material such as a woodbase panel, which may optionally be matched to the decor (called a decor-synchronous structure). In the case of wood decors, the structures may take the form of pore structures that follow the grain. In many decors, the structures may be depressions in the region of joint filling lines encompassed by the decor.

The present process is performed in an apparatus for transferring analog decor templates into decor printing, wherein the apparatus comprises

- at least one means of generating and storing 1 to n hyperspectral digital images;
- at least one means of creating and storing a decor-specific reference target;
- at least one means of creating and storing a decor-specific profile target;
- at least one means of computing and storing a corrected decor-specific profile target;
- at least one means of outputting the digitalized template of the analog decor template taking account of a corrected decor-specific profile target or an adjusted corrected decor-specific profile target;
- at least one means of ascertaining a similarity index between at least one of the 1 to n hyperspectral digital reference images and at least one of the 1 to n hyperspectral actual digital images; and
- at least one means of adjusting the corrected decor-specific profile target taking account of the similarity index ascertained between at least one of the 1 to n hyperspectral digital reference images and at least one of the 1 to n hyperspectral actual digital images.

The above-described advantages and advantageous embodiments for the method of the invention are equally applicable to the apparatus of the invention, and so reference is made to the statements above.

As mentioned, the at least one means of generating and storing a hyperspectral digital image is preferably a hyperspectral scanner and/or a hyperspectral camera. Preferably, the 1 to n hyperspectral digital reference images and the 1 to n hyperspectral actual digital images are recorded by the same means of generating a hyperspectral digital image. In another embodiment, the 1 to n reference images may be recorded with a first means of generating and storing a hyperspectral digital image, and the 1 to n actual images with a further means of generating and storing a hyperspectral digital image.

The at least one means of creating and storing a decor-specific reference target, the at least one means of creating and storing a decor-specific profile target and the at least one means of computing and storing a corrected decor-specific profile target are preferably each computation units having corresponding software known to the person skilled in the art. The at least one means of creating and storing a decor-specific reference target, the at least one means of creating and storing a decor-specific profile target and the at least one means of computing and storing a corrected decor-specific profile target is preferably one the same computation unit. This embodiment is particularly economically viable and resource-saving. A computation unit is, for example, a process computer or a control computer.

According to the invention, the at least one means of outputting the digitalized template of the analog decor template taking account of a corrected decor-specific profile target or an adjusted decor-specific profile target is an apparatus for direct or indirect digital printing, preferably an apparatus for digital direct printing.

The apparatus further comprises at least one means of ascertaining the similarity index between at least one of the 1 to n reference images and at least one of the 1 to n actual images and at least one means of adjusting the corrected decor-specific profile target taking account of the ascertained similarity index and hence the ascertained color variances between at least one of the 1 to n hyperspectral digital reference images and at least one of the 1 to n hyperspectral actual digital images. These means are each computation units having software known to the person skilled in the art. In a preferred embodiment, the at least one means of ascertaining the similarity index between at least one of 1 to n reference images and at least one of the 1 to n actual images and the at least one means of adjusting the corrected decor-specific profile target taking account of the ascertained color variances between at least one of the 1 to n reference images and at least one of the 1 to n actual images is one and the same computation unit.

In one embodiment, the apparatus of the invention further comprises at least one means of generating a digital template of the analog decor template. This one means of generating and storing a digital template of the analog decor template is, for example, a scanner having a computation unit or a camera, especially a digital camera.

A production line for the printing of woodbase panels with an original comprises means of priming, a means of printing the original, preferably a digital printer, and, in a more advanced variant, at least one means of applying a protective layer to the carrier material decorated with the respective print. This means or apparatus for applying a protective layer is preferably disposed downstream of the print line.

In a preferred embodiment, the production line has at least one short-cycle press for compression of the carrier material provided with the printed decor and the protective layer disposed thereon.

The method of the invention and the apparatus of the invention enable transfer of analog decor templates into decor printing in a true-color manner. Customer demands for true-color reproduction can advantageously be taken into account by the specification of the target value for the similarity index. This increases the economic viability of the present invention since the print quality in the decor printing can be adjusted to existing customer wishes. Furthermore, the economic viability of the present invention can further be enhanced in that a multitude of method steps can proceed on the same apparatus means. For instance, it is possible, in one embodiment of the invention, to implement the entire method by means of one computation unit, one means of generating a hyperspectral image and one output device.

The present invention, through the provision of an original for an analog decor template, likewise enables simple adaptation to further printing tasks. For example, adaptation to further output devices, such as other printer devices or other carrier materials, is facilitated. If the digital device of the analog decor template has been used on another print device and/or on output to another carrier material than has been used for the creation of the original, the original may serve as reference for the adjustment of the printing operation. It is thus advantageously possible in a simple manner to output the analog decor template in a true-color manner on different printers and/or of the different carrier materials as well.

In one embodiment of the invention, therefore, the original is used to create an original profile target which is at first in digital form. The original profile target contains, as well as the original, additional color fields having standard colors of a previously defined color space. The standard colors are preferably defined by software. A suitable example for this purpose is the Colorgate Fingerprint Tool software from Colorgate. The original profile target may then be output onto a carrier material of the invention on any suitable output device. The result is a carrier material decorated with the original profile target. The color fields of the original profile target output onto the carrier material are subsequently analyzed by colorimetry. For this purpose, in a preferred embodiment of the invention, 1 to n digital hyperspectral images of the target material decorated with the original profile target are recorded. Preference is given to recording sufficient hyperspectral images to image the entire output original profile target. With the aid of suitable software, the 1 to n digital hyperspectral images are used to determine the color values of the color fields of the output original profile target. According to the invention, the color variances between the color values of the color fields of the original profile target in digital form and the color values of the color fields of the original profile target output onto the carrier material are then ascertained.

In a preferred embodiment, for this purpose, the color values of the color fields of the original profile target are compared with the color values of the color fields of the output original profile target with the aid of software and, in the event of variances between the color values, a corrected original profile target is generated and stored taking account of the color variances ascertained. Software suitable for this purpose is known to the person skilled in the art.

In a further embodiment, the color values of the color fields of the original profile target in digital form are compared with the color values of the color fields of the original profile target output onto the carrier material by means of a similarity index. If the similarity index is below a defined target value, a corrected original profile target is calculated and stored taking account of the color variances ascertained.

In one embodiment of the method of the invention, therefore, the original is used to generate a digital original profile target and a corrected original profile target, comprising the steps of:

creating a digital original profile target;
outputting the digital original profile target onto a carrier material with an output device;
generating 1 to n hyperspectral digital images of the carrier material provided with the original profile target;
determining the color values of the original profile target output onto the carrier material from the 1 to n digital hyperspectral images;
ascertaining the color variances between the color values of the color fields of the original profile target in digital form and the color values of the color fields of the original profile target output onto the carrier material;
generating and storing a corrected original profile target taking account of the color variances ascertained.

In one embodiment of the invention, the corrected original profile target is output again on a carrier material on the output device already used. Advantageously on the same kind of carrier material as in the previous output. Again, 1 to n hyperspectral digital images of the corrected original profile target output onto the carrier material are generated and the similarity thereof with the original profile target is ascertained again. This procedure enables monitoring of the trueness of color of the original profile target output onto a carrier material with respect to the original profile target in digital form. If necessary, another correction can be undertaken.

The determining of the color values of the original profile target output onto the carrier material from the 1 to n digital hyperspectral images and the comparison of the color values of the color fields of the original profile target in digital form with the color values of the color fields of the original profile target output onto the carrier material is preferably implemented automatically with the aid of suitable software on a computation unit.

Suitable software for this purpose is known to those skilled in the art. In one embodiment of the invention, it is additionally also possible to undertake manual alterations to the color values of the color fields with the aid of suitable software.

By this embodiment of the method, it is advantageously possible to adjust the original easily and rapidly to various output devices and/or various carrier materials by creating an original profile target and a corrected original profile target. For any further output device used and/or any further carrier material used, an original profile target and a corrected original profile target are thus generated, which then each enable true-color decor printing of the digital template of the analog decor template. Suitable output devices and suitable carrier materials are all output devices and carrier materials that have already been described in the context of the present invention.

This advantageously enables true-color decor printing, especially digital decor printing, of a digital template of an analog decor template onto various carrier materials and/or with the aid of various output devices.

BRIEF DESCRIPTION OF THE DRAWINGS

The invention is elucidated in detail hereinafter by a FIGURE and six working examples. The FIGURE shows:

FIG. 1: one embodiment of the method of the invention.

DESCRIPTION OF THE INVENTION

FIG. 1 shows an analog decor template 10, of which 1 to n hyperspectral digital reference images are recorded by means of a device for recording hyperspectral images 11. One of these images depict a section from the analog decor template 10. This section is identified in the analog decor template 10 by a box in FIG. 1. 1 to n reference images are stored in the computation unit 12, and a decor-specific reference target 30 is created in the computation unit. The means of generating a digital template of the analog decor template 20 are used to create a digital template of the analog decor template 21. The means of generating a digital template of the analog decor template 20 may, for example, be a scanner or a digital camera.

The digital template of the analog decor template 21 is stored in the computation unit 12, and a decor-specific profile target 31 of the digital template of the analog decor template 21 is created in the computation unit 12. According to the invention, the computation unit 12 calculates a corrected decor-specific profile target from the decor-specific reference target 30 and the decor-specific profile target 31. The output device 13 outputs the digital template of the analog decor template 21 using the corrected decor-specific profile target onto a carrier material, so as to form a decorated carrier material 14. The output device 13 may be a device for intaglio printing or, more preferably, a device for digital direct printing.

According to the invention, 1 to n hyperspectral actual digital images of the decorated carrier material 14 are recorded with a device for recording hyperspectral images 15. The actual images here depict the same sections from the decor as the reference images.

This is indicated in FIG. 1 by a box on the decorated carrier material 14. The computation unit 12 calculates the similarity index between the actual images and the reference images by the method of the invention and, if the similarity index is below a defined target value, the decor-specific profile target 31 is adjusted. According to the invention, the corrected decor specific profile target is then adjusted in the computation unit 12 taking account of the similarity index ascertained and the resulting color variances.

Subsequently, the digital template of the analog decor template 21 is output onto a carrier material using the adjusted corrected decor-specific profile target on the output device 13, which in turn produces a decorated carrier material 14. 1 to n hyperspectral actual digital images of the decorated carrier material 14 are recorded with a device for recording hyperspectral images 15. The computation unit 12 calculates the similarity index between the actual images and the reference images by the method of the invention and, if the similarity index is again below a defined target value, the corrected decor-specific profile target is adjusted again. Adjustment of the corrected decor-specific profile target by method step h) is conducted until the similarity index between at least one of the 1 to n actual images and at least one of the 1 to n reference images is above a defined target value.

Working Example 1

5 hyperspectral digital reference images of an analog decor template showing a wood grain were recorded. The reference images were used to create a decor-specific reference target with software on a computation unit. The analog decor template was scanned by means of a scanner, and a digital template of the analog decor template was produced. This was likewise stored in the computation unit. 5 sections of the digital template of the analog decor template that depict identical regions of the decor with the sections of the 5 reference images of the analog decor were used to create a decor-specific profile target with software on a computation unit. The decor-specific reference target and the decor-specific profile target were automatically used to create a corrected decor-specific profile target in the computation unit. The digital template of the analog decor template was printed onto a primed woodbase panel on a digital printer taking account of the corrected decor-specific profile target. For this purpose, the woodbase panel was ground beforehand, upgraded with an aqueous resin solution and then given a white undercoat. 5 hyperspectral actual digital images of the decor printed onto the woodbase panel were recorded. The actual images were recorded of sections of the printed decor that are identical to the sections of the reference images. The similarity comparison gave the following similarity indices:

| Image pair | Similarity index |
| --- | --- |
| 1 | 94% |
| 2 | 93% |
| 3 | 95% |
| 4 | 90% |
| 5 | 92% |

At the start of the method, a minimum target value for the similarity index of 89% was fixed. All similarity indices are thus above the target value. The corrected decor-specific profile target was then stored as original.

Working Example 2

5 hyperspectral digital reference images of an analog decor template showing a wood grain were recorded. The reference images were used to create a decor-specific reference target with software on a computation unit. The analog decor template was scanned by means of a scanner, and a digital template of the analog decor template was produced. This was likewise stored in the computation unit. 5 sections of the digital template of the analog decor template that depict identical regions of the decor with the sections of the 5 reference images of the analog decor were used to create a decor-specific profile target with software on a computation unit. The decor-specific reference target and the decor-specific profile target were automatically used to create a corrected decor-specific profile target in the computation unit. The digital template of the analog decor template was printed onto a primed woodbase panel on a digital printer taking account of the corrected decor-specific profile target. For this purpose, the woodbase panel was ground beforehand, upgraded with an aqueous resin solution and given a white undercoat. 5 hyperspectral actual digital images of the decor printed onto the woodbase panel were recorded. The actual images were recorded of sections of the printed decor that are identical to the sections of the reference images. The similarity comparison gave the following similarity indices:

| Image pair | Similarity index |
| --- | --- |
| 1 | 93% |
| 2 | 85% |
| 3 | 84% |
| 4 | 91% |
| 5 | 88% |

At the start of the method, a minimum target value for the similarity index of 89% was fixed. The similarity indices for image pairs 2, 3 and 5 were thus below the target value.

Software from Colorgate was used to calculate a color profile, which was used as a basis to adjust the corrected decor-specific profile target in the software. Taking account of the adjusted corrected decor-specific profile target, the same digital printer was used for printing onto a woodbase panel which, like the woodbase panel beforehand, had been primed with an aqueous resin solution and ground. Another 5 hyperspectral actual digital images of the decor printed onto the woodbase panel were recorded. The actual images were again recorded of sections of the printed decor that identical to the sections of the reference images. The similarity comparison gave the following similarity indices:

| Image pair | Similarity index |
| --- | --- |
| 1 | 96% |
| 2 | 93% |
| 3 | 91% |
| 4 | 94% |
| 5 | 96% |

All similarity indices were now above the target value. The adjusted corrected decor-specific profile target was then stored as original.

Working Example 3

5 hyperspectral digital reference images of an analog decor template showing a wood grain were recorded. The reference images were used to create a decor-specific reference target with software on a computation unit. The analog decor template was scanned by means of a scanner, and a digital template of the analog decor template was produced. This was likewise stored in the computation unit. 5 sections of the digital template of the analog decor template that depict identical regions of the decor with the sections of the 5 reference images of the analog decor were used to create a decor-specific profile target with software on a computation unit. The decor-specific reference target and the decor-specific profile target were automatically used to create a corrected decor-specific profile target in the computation unit. The digital template of the analog decor template was printed onto a primed paper sheet on a digital printer taking account of the corrected decor-specific profile target. A primer was applied to the paper sheet for priming. The paper sheet used had a weight of 70 g/m². 5 hyperspectral actual digital images of the decor printed onto the paper sheet were recorded. The actual images were recorded of sections of the printed decor that are identical to the sections of the reference images. The similarity comparison gave the following similarity indices:

| Image pair | Similarity index |
|---|---|
| 1 | 94% |
| 2 | 93% |
| 3 | 95% |
| 4 | 90% |
| 5 | 92% |

At the start of the method, a minimum target value for the similarity index of 89% was fixed. All similarity indices are thus above the target value. The corrected decor-specific profile target was then stored as original.

Working Example 4

5 hyperspectral digital reference images of an analog decor template showing a wood grain were recorded. The reference images were used to create a decor-specific reference target with software on a computation unit. The analog decor template was scanned by means of a scanner, and a digital template of the analog decor template was produced. This was likewise stored in the computation unit. 5 sections of the digital template of the analog decor template that depict identical regions of the decor with the sections of the 5 reference images of the analog decor were used to create a decor-specific profile target with software on a computation unit. The decor-specific reference target and the decor-specific profile target were automatically used to create a corrected decor-specific profile target in the computation unit. The digital template of the analog decor template was printed onto a primed paper sheet on a digital printer taking account of the corrected decor-specific profile target. A primer was applied to the paper sheet for priming. The paper sheet used had a weight of 70 g/m². 5 hyperspectral actual digital images of the decor printed onto the paper sheet were recorded. The actual images were recorded of sections of the printed decor that are identical to the sections of the reference images. The similarity comparison gave the following similarity indices:

| Image pair | Similarity index |
|---|---|
| 1 | 85% |
| 2 | 93% |
| 3 | 91% |
| 4 | 84% |
| 5 | 88% |

At the start of the method, a minimum target value for the similarity index of 89% was fixed. The similarity indices for image pairs 1, 4 and 5 were thus below the target value.

Software from Colorgate was used to calculate a color profile, which was used as a basis to adjust the corrected decor-specific profile target in the software. Taking account of the adjusted corrected decor-specific profile target, the same digital printer was used for printing onto a paper sheet which, like the paper sheet beforehand, had been primed. Another 5 hyperspectral actual digital images of the decor printed onto the woodbase panel were recorded. The actual images were again recorded of sections of the printed decor that identical to the sections of the reference images. The similarity comparison gave the following similarity indices:

| Image pair | Similarity index |
|---|---|
| 1 | 96% |
| 2 | 93% |
| 3 | 91% |
| 4 | 94% |
| 5 | 96% |

All similarity indices were now above the target value. The adjusted corrected decor-specific profile target was then stored as original.

Working Example 5—Finishing HDF Board

HDF boards, at an application of a primer, are printed with an original according to working examples 1 and 2 by digital printing and processed further as follows:

The printed HDF boards were individualized before production line and transported through the downstream production facility at a speed of 28 m/min.

In a first roll application unit, about 70 g of liquid melamine resin (solids content: 55% by weight) containing the customary auxiliaries (hardener, wetting agent etc.) is applied to the board surface. A roll application unit is likewise used to apply a melamine resin to the underside of the board (amount applied: 60 g of liquid resin/m², solids content about 55% by weight).

Thereafter, 14 g of corundum/m² (F 200) is scattered onto the surface with a scattering apparatus. Thereafter, a melamine resin layer (solids content: 55% by weight) is applied in an amount of 25 g/m². This too contains the customary auxiliaries. Likewise applied to the underside of the board with a roll application unit is a melamine resin (amount applied: 50 g of liquid resin/m², solids content: about 55% by weight). The board is dried in an air circulation dryer.

Thereafter, a melamine resin additionally containing glass beads is applied to the board surface. The glass beads have a diameter of 60 and 80 µm. The amount of the resin applied is about 20 g of liquid melamine resin/m² (solids content: 61.5% by weight). The formulation includes not only the hardener and the wetting agent but also a separating agent. The amount of glass beads applied is about 3 g/m². Likewise applied to the underside of the board with a roll application unit is a melamine resin (amount applied: 40 g of liquid resin/m², solids content: about 55% by weight). The board is again dried in an air circulation dryer and then coated once again with a melamine resin containing glass beads. A further component present is cellulose (Vivapur 302). Again, about 20 g of liquid melamine resin/m² (solids content: 61.6% by weight) is applied. Again, about 3 g of glass beads and 0.25 g of cellulose/m² are applied here. The formulations include not only the hardener and the wetting agent but also a separating agent. Likewise applied to the underside of the board with a roll application unit is a melamine resin (amount applied: 30 g of liquid resin/m², solids content: about 55% by weight). The resin is in turn dried in an air circulation dryer, and then the board is pressed in a short-cycle press at 200° C. and a pressure of 400 N/cm². The pressing time was 10 seconds. A structure was imparted using a press plate having a wood structure.

Depending on the roll application, the amount of resin varies in the range from 5 g/m² to about 100 g/m²; it is also possible here for the solids content of the resin to vary within the range from 50% by weight to about 80% by weight. The amount of corundum varies between 2 g/m² and 30 g/m². The glass corundum admixtures likewise vary in their respective amounts.

Working Example 6—Paper

A primer was applied to a print base paper having a weight of 70 g/m², and then the print base paper was printed with an original according to working examples 1 and 2 by digital printing and processed further as follows:

The decorated paper sheets were impregnated with aqueous melamine resin. After the drying, the paper sheets were cut and stacked as a laminate for pressing. For the production of a laminate, as described hereinafter, various layers were stacked. First of all, a resin-impregnated paper ply as backing was applied to the underside of a carrier board, which was a particleboard in this working example. The impregnated decorated paper ply was applied to the top side of the carrier board, and an overlay thereon. The overlay utilized was a resin-impregnated transparent paper ply modified with hard substance particles. The stack was run into a short-cycle press and pressed to laminate under the action of heat and pressure. For this purpose, a structured press plate was used on the top side in the short-cycle press, such that a structure was produced on the surface of laminate. The structure produced is at least partly synchronous with the decor of the paper ply.

LIST OF REFERENCE NUMERALS 10 analog decor template
11, 15 device for recording hyperspectral images
12 computation unit
13 output device
14 decorated carrier material
20 means of generating a digital template of the analog decor template
21 digital template of the analog decor template
30 decor-specific reference target
31 decor-specific profile target

The invention claimed is:
1. A method of transferring analog decor templates into decor printing, comprising comparison of similarity between at least one of 1 to n hyperspectral reference images of an analog decor template and at least one of 1 to n hyperspectral actual digital images of a decorated carrier material, where n∈N, the method comprising the steps of:
a) producing and storing 1 to n hyperspectral digital reference images of the analog decor template, wherein each hyperspectral digital reference image depicts data from 20 to 250 channels that range from wavelengths in the ultraviolet region to the longwave infrared;
b) creating a decor-specific reference target from the 1 to n hyperspectral digital reference images, wherein the creating of a decor-specific reference target from the 1 to n hyperspectral digital reference images comprises the compounding of the individual hyperspectral digital reference images by means of graphics software when n>1 and the color values that occur most frequently in the 1 to n reference images are imaged as decor-specific color values in the decor specific reference target;
c) creating a digital template of the analog decor template by scanning or photographing the analog decor template;
d) creating a decor-specific profile target from the digital template of the analog decor template using one or more sections of the digital template of the analog decor template that depict an identical section or identical sections of the decor to the 1 to n digital hyperspectral reference images and the color values that occur most frequently in one or more sections of the digital template of the analog decor template are imaged as decor-specific color values in the decor-specific profile target;
e) computing a corrected decor-specific profile target from the decor-specific reference target and the decor-specific profile target by comparing the color values of the decor-specific profile target with the color values of the color fields of the decor-specific reference target and correcting the color values of the color fields of the decor-specific profile target that vary from the color value of the assigned color field of the decor-specific reference target;
f) outputting the digital template of the analog decor template onto a carrier material by means of an output device taking account of the corrected decor-specific profile target;
g) producing 1 to n hyperspectral actual digital images of the decorated carrier material, wherein the 1 to n hyperspectral actual digital images are recorded in the same sections of the decor as the 1 to n hyperspectral digital reference images;
h) ascertaining the color variances and the similarity index between at least one of the 1 to n hyperspectral digital images of the decorated carrier material and at least one of the 1 to n hyperspectral digital reference images; and
i) adjusting and storing the corrected decor-specific profile target taking account of the color variances ascertained when the similarity index is below a defined target value, outputting the digital template of the analog decor template onto a carrier material by means of an output device taking account of the adjusted corrected decor-specific profile target, and repeating steps g) to h),
wherein adjusting of the corrected decor-specific profile target in method step i) is conducted until the similarity index between at least one of the 1 to n hyperspectral actual digital images and at least one of the 1 to n hyperspectral digital reference images is above a defined target value.

2. The method according to claim 1, wherein the 1 to n reference images depict a section or sections of the analog decor template that are characteristic of the decor.

3. The method according to claim 1, wherein the output of the digitalized template of the analog decor template in method step f) is effected by means of digital printing.

4. The method according to claim 1, wherein digital template of the analog template is output in method step f) onto a carrier material selected from the group consisting of paper, glass, metal, foils, woodbase materials, WPC boards, veneers, paint layers, plastic sheets and inorganic carrier sheets.

5. The method according to claim 4, wherein the woodbase materials comprise MDF boards or HDF boards.

6. The method according to claim 1, wherein the corrected decor-specific profile target or the adjusted corrected profile target with which a decorated carrier material is produced in method step f) and which has a similarity index ascertained in method step h) between at least one of the 1 to n actual images of the decorated carrier material and at least one of the 1 to n reference images that is above a defined target value is stored as the digital original of the analog decor template.

7. The method according to claim 6, wherein the original is used to produce a digital original profile target and a corrected original profile target, comprising the steps of:
- creating a digital original profile target;
- outputting the digital original profile target onto a carrier material with an output device;
- generating 1 to n hyperspectral digital images of the carrier material provided with the original profile target;
- determining the color values of the original profile target output onto the carrier material from the 1 to n digital hyperspectral images;
- ascertaining the color variances between the color values of the color fields of the original profile target in digital form and the color values of the color fields of the original profile target output onto the carrier material; and
- generating and storing a corrected original profile target taking account of the color variances ascertained.

8. A production line for the printing of woodbase panels with an original obtained by a method according to claim 6, comprising
- a means of priming; and
- a means of printing the original.

9. The production line according to claim 8, further comprising at least one means of applying a protective layer.

10. The production line according to claim 9, wherein the means of applying a protective layer is positioned after the means of printing the original.

11. The production line according to claim 9, further comprising a short-cycle press for compression of the carrier material provided with the printed decor and the protective layer disposed thereon.

12. The production line according to claim 8, wherein the means of printing the original is a digital printer.

13. An apparatus for transferring analog decor templates into decor printing, wherein the apparatus is set up to implement a method according to claim 1, said apparatus comprising:
- at least one means of generating and storing 1 to n hyperspectral digital images, selected from a hyperspectral scanner and/or a hyperspectral camera;
- at least one computation unit for creating and storing a decor-specific reference target;
- at least one means of creating and storing a decor-specific profile target, selected from a camera or digital camera;
- at least one computation unit for creating and storing a decor-specific profile target;
- at least one computation unit for computing and storing a corrected decor-specific profile target;
- at least one means of outputting the digitalized template of the analog decor template taking account of a corrected decor-specific profile target or an adjusted corrected decor-specific profile target, selected from an apparatus for direct or indirect digital printing;
- at least one computation unit ascertaining a similarity index between at least one of the 1 to n hyperspectral digital reference images and at least one of the 1 to n hyperspectral actual digital images; and
- at least one computation unit adjusting the corrected decor-specific profile target taking account of the similarity index ascertained between at least one of the 1 to n hyperspectral digital reference images and at least one of the 1 to n hyperspectral actual digital images.

* * * * *